Dec. 9, 1958  K. C. ENVOLDSEN  2,863,779
METHOD OF PREPARING SHRIMP IN FROZEN CONDITION
Filed Aug. 20, 1954
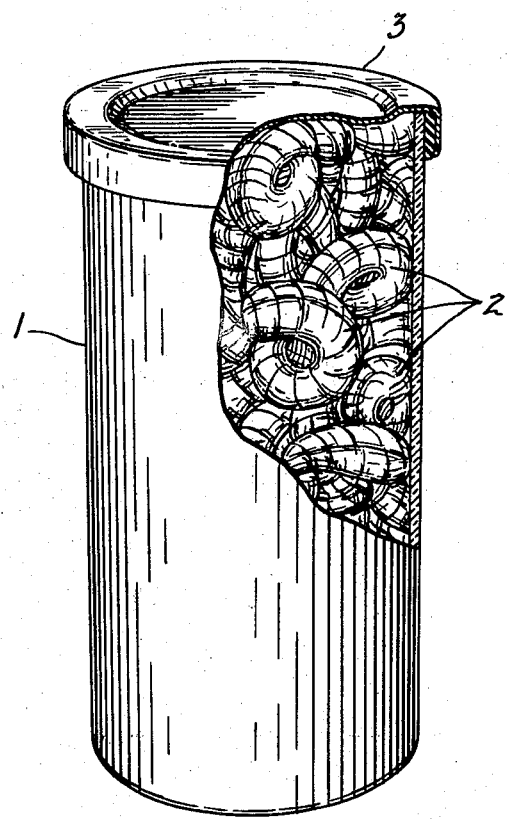
INVENTOR
Karl C. Envoldsen
BY Evans + McCoy
ATTORNEYS

2,863,779

METHOD OF PREPARING SHRIMP IN FROZEN CONDITION

Karl C. Envoldsen, Lakewood, Ohio

Application August 20, 1954, Serial No. 451,167

5 Claims. (Cl. 99—195)

The present invention relates to a method of packaging cooked shrimp so that it can be stored and maintained in ordinary or 0° F. refrigeration for extended periods of time. It also relates to a package of shrimp and similar sea food which may be stored for extended periods under refrigerated conditions and be ready for immediate consumption.

In my Patent 2,600,627, dated June 17, 1952, and entitled "Process of Treating Shrimp," I describe a method of treating shrimp wherein the shrimp bodies are cooked in an aqueous saline solution at a temperature less than boiling and preferably 170° F. to 210° F for about three to eight minutes. Shrimp cooked in the above manner have an extremely good flavor, are very tender and crisp. It has been the general practice either to consume the shrimp cooked in the above manner with in a few days or to freeze them and maintain them in the frozen condition until a few days prior to use. Shrimp are in best flavor and texture when stored out of contact with cooking liquid. Attempts have been made to store cooked shrimp in the absence of sufficient liquid to fill the cans, jars and the like. However, when shrimp have been packaged dry in sealed containers they have spoiled within a relatively short time even when maintained under refrigerated conditions such as a temperature under 42° F. and preferably about 40° F. Shrimp packaged dry in glass jars for example have an excellent sales appeal, but because of the quick spoilage of shrimp so packed, it has been considered necessary to package cooked shrimp in porous paper containers even though they are always maintained under atmospheric conditions. In ventilated paper containers moist unfrozen shrimp may be kept for about a week in the refrigerator. When longer storage is desired shrimp must be kept frozen.

When cooked shrimp bodies have been frozen they should be thawed under refrigerated conditions for one to five days before they are consumed in order to rehydrolyze the proteins to the normal state. If frozen shrimp are thawed in any manner except under refrigerated conditions, they have a watery fibrous consistency which is overcome by storage in a refrigerator for a few days. One having frozen shrimp in storage must, therefore, in accordance with previous practice anticipate by at least one to five days when he will consume them in order to have a good taste and texture.

It is the object of the present invention to provide a method of packaging cooked shrimp which provides packages of shrimp which may be stored for extended periods in refrigerators ready for immediate consumption.

It is another object of the present invention to provide a package of cooked shrimp which may be stored and displayed in non-freezing conditions at temperatures below 40° F. for several weeks.

It is a further object of the present invention to provide a frozen shrimp package which may be displayed and stored in a thawed condition for many weeks without spoilage so that it may be removed from an ordinary household refrigerator and consumed when desirable.

Other objects and advantages will become apparent to those skilled in the art from the following description of the process and product as illustrated in the accompanying drawing which is a perspective view of one suitable package of shrimp embodying the present invention.

The present invention is based upon my discovery that when cooked shrimp are placed in a container under sufficiently reduced pressure they may be stored for extended periods such as forty days or more at temperatures around 40° F. or below, and may be removed from such containers and consumed immediately without impaired flavor or quality. It appears that the spoilage of shrimp in closed containers such as glass jars or cans under ordinary refrigeration conditions is due to enzymic oxidation coupled with or accelerated by moisture on the surface of the shrimp. Otherwise shrimp could be stored under atmospheric pressure in closed jars for periods at least as long as they could be stored in open or paper packages. A large part of the spoilage, however, is apparently caused by oxygen which permits enzymic action in the shrimp until the oxygen is used up. Oxygen within the package is the enemy of all frozen or packaged foods. Eliminating that oxygen in any degree helps preservation but eliminating most of the oxygen through vacuum sealing at 25 to 28 inches of vacuum gives an incredibly long preservation period under ordinary refrigeration of 33° to 40° F. Only glass jars of proper design and extra heavy tin cans will hold such high vacuum.

While I believe that the above reasons account for the spoilage heretofore had in cooked shrimp packaged in glass or impervious containers I do not wish to be limited by such an explanation. Regardless of the reason for the spoilage heretofore I have found in accordance with the present invention that when the amount of oxygen in the containers containing the cooked shrimp is reduced sufficiently as by application of a vacuum of at least 20 and preferably at least 25 inches of mercury to the shrimp container, that packaged shrimp may be stored as long as 40 to 50 days under ordinary refrigeration conditions such as temperatures of about 32° F. to 40° F. or even 45° F. without having spoilage of shrimp in the container. The amount of atmospheric oxygen permitted to remain in the shrimp is very critical. When the vacuum applied to the containers is less than 20 inches, i. e. when the pressure in the container is more than 10 inches of mercury the time during which shrimp can be stored in the closed container is very materially decreased and at normal pressures and normal oxygen concentration the spoilage ordinarily occurs within a few days.

In the practice of the present invention the shrimp may be pre-cooked in any convenient manner but it is especially desirable to cook the shrimp as described in my aforementioned patent, which is hereby incorporated herein and made a part hereof by reference to show preferred cooking procedures. As described in the above mentioned patent, the shrimp are preferably sorted as to size, the large shrimp bodies being cooked for longer periods of time than the small shrimp bodies, but all being cooked within a time limit of about three to eight minutes at temperatures which are preferably slightly below 212° F. in an aqueous saline solution having a salinity of about 20° salinometer to 90° salinometer and preferably 30° to 40° salinometer. It is desirable to accomplish cooking of the shrimp at as low a temperature as possible and therefore it is preferable to cook in the lower portion of the 170° F. to 210° F. range, that is, in the region of about 180° F.

The present invention, however, is not limited to the packaging of shrimp cooked at such temperatures although it is particularly applicable to such cooked shrimp. After cooking of the shrimp bodies as above described they are preferably rapidly cooled as by immersion in a cool bath of icy treating fluid or ice water. When the temperature has been rapidly lowered they are drained, packaged in suitable impervious containers, subjected to a vacuum of at least 20 inches of mercury and sealed to retain the vacuum and to prevent ingress of air into the container. The container containing the shrimp under vacuum may be stored at ordinary refrigeration temperatures for as much as 50 days or so without apparent change in looks or taste. If desired, the packaged shrimp before or after application of the vacuum may be stored under freezing conditions for very extended periods of time, thawed while under vacuum in a closed container, and permitted to remain under vacuum under ordinary refrigeration conditions for as much as 50 days or so and still retain their edible quality. Freezing is preferably accomplished, however, after application of the vacuum or after displacing of the major amount of air from the container as the presence of the vacuum further enhances the keeping quality of the shrimp while they are in frozen condition.

The following examples illustrate the present invention:

*Example 1*

Raw shrimp bodies are received and sorted as to size, shelled and sand veins removed as described in my Patent 2,622,270, the shelling, deveining and cleaning process being accomplished in as short a time as practical in order to minimize exposure of the shrimp bodies to the atmosphere. Following the cleaning, the shrimp bodies are immersed in an aqueous saline solution of 40° salinometer and maintained in the treated fluid at a temperature of about 180° F. for about three to eight minutes, the small shrimp bodies being heated for about three minutes, and the larger ones up to eight minutes or until the shrinkage of the bodies is substantially stopped. The aqueous saline solution also contains spices such as pepper, thyme and bay and vinegar in order to determine the period where shrinkage ceased, this being the point where spicy taste is first noticed in the shrimp. The shrimp thus cooked were removed from the hot saline solution, placed into ice water to rapidly cool them and when cool were immediately packed into a container such as the glass jar 1 shown in the drawing attached hereto. The container or jar containing the shrimp 2 was subjected to vacuum of 25 inches of mercury to reduce the pressure therein to about four or five inches of mercury and maintained at such pressure while the lid 3 is applied to effect a seal. As thus filled under reduced pressure it was placed in a refrigerator which was maintained at 40° F. When the container was removed 40 days thereafter the shrimp had no noticeable inferior flavor and were apparently in excellent condition.

*Example 2*

When shrimp cooked in accordance with the same procedure and for the same time as in Example 1, were placed in a container of the same size and sealed without reducing the temperature and stored in the same refrigerator as that used in Example 1, a sample of such shrimp when tasted was spoiled in two days.

*Example 3*

Shrimp cooked as in my aforementioned patent are packaged as in Example 1 under reduced pressure in rigid containers. The containers containing the shrimp under reduced pressure are placed in a quick freeze freezer and frozen at a temperature of about −5° F. The packages of frozen shrimp after storing at freezing temperature for more than a year, are removed and placed in a refrigerator at a temperature of less than 45° F. and at preferably less than 40° F. and allowed to thaw. After five weeks the containers are opened and no noticeable deterioration has occurred. They are entirely edible.

While it is desirable to cook shrimp as described above, shrimp cooked by other procedures even at temperatures above boiling, may be packaged in accordance with the present process, also with improved keeping qualities. While I prefer to utilize vacuum of at least 20 inches of mercury, substantially less vacuum may be used when nitrogen or inert gas is also used to displace oxygen from the container. Even with inert gas a subatmospheric pressure is desirable.

The present invention permits the retailer to display shrimp in glass containers or in cans with the shrimp in the unfrozen and edible condition. It permits the housewife to buy such shrimp and retain it in her refrigerator for extended periods in the unfrozen condition and still have it available for immediate use at all times. The previous requirement that shrimp be purchased or thawed two or three days prior to intended use is thus eliminated.

While the present invention is primarily applicable to the packaging of cooked shrimp I also find that frozen uncooked foods such as meats, vegetables and fruits have much superior taste, texture and resistance to spoilage when the aforementioned vacuums are applied to suitable containers containing them, and the foods maintained under such vacuum. Thus I find that fresh peas, corn, and berries, when packed into impervious rigid containers such as glass jars etc. (the cooked shrimp in the drawing and in previous examples being substituted by the fresh uncooked food) and a vacuum of over 20 inches and preferably of at least 25 inches of mercury is applied and the container sealed to maintain such vacuum and placed and maintained under freezing conditions, have after even one year much superior texture and flavor to that of identical foods frozen and stored under identical conditions in the absence of vacuum. Some of the advantages of vacuum can also be obtained by the use of an inert gas such as nitrogen, argon, helium etc. at higher pressures such as atmospheric pressure etc. The reduced pressure is preferable however even when an inert gas is used in place of air.

It is to be understood that in accordance with the provisions of the patent statutes variations and modifications of the specific invention herein shown and described for purposes of illustration may be made without departing from the spirit of the invention.

What I claim is:

1. A method for packaging shrimp so that it can be stored under ordinary refrigeration conditions for substantial periods, said method comprising cooking the shrimp, rapidly cooling it and packing it into rigid air-impermeable containers having strength sufficient to withstand substantially reduced pressure, subjecting said containers and said shrimp to a vacuum so that the pressure on the shrimp is reduced to a pressure not in excess of 10 inches of mercury, sealing the container to maintain the shrimp under such reduced pressure, and storing said containers under refrigerated conditions.

2. A method of claim 1 wherein the shrimp is cooled to a temperature not greater than 45° F. but not frozen before it is packed.

3. A method according to claim 1 wherein the shrimp is cooked for three to eight minutes at a temperature of 170° F. to 210° F. and rapidly cooled prior to packaging.

4. A method according to claim 1 wherein the pressure is reduced below five inches of mercury when the package is sealed.

5. A method for packaging shrimp so that it can be stored for extended periods in the frozen condition without appreciable loss of flavor, said method comprising placing said shrimp into a rigid container, freezing the shrimp and reducing the pressure thereon to a value which is not in excess of 10 inches of mercury while said food is at a temperature not in excess of 45° F., sealing the container while its contents are under said reduced pressure to prevent ingress and egress of solid, liquid and gaseous materials so as to maintain a reduced pressure therein, said shrimp being in an edible unsterilized condition in said container when they are incorporated therein while in a cooled condition and without subsequent heat-sterilization in said container.

References Cited in the file of this patent

UNITED STATES PATENTS

| | | |
|---|---|---|
| 2,364,049 | Bensel | Dec. 5, 1944 |
| 2,376,583 | DePoix | May 22, 1945 |
| 2,490,951 | Dunkley | Dec. 13, 1949 |
| 2,546,428 | Byrd | Mar. 27, 1951 |
| 2,600,627 | Envoldsen | June 17, 1952 |
| 2,621,129 | Ramsbottom et al. | Dec. 9, 1952 |
| 2,623,826 | Grinstead | Dec. 30, 1952 |

OTHER REFERENCES

"Food Engineering," April 1954, page 144, article entitled Shrimp in Cans.